3,052,536
PREPARATION OF ACTINIDE-ALUMINUM ALLOYS

Raymond H. Moore, Kennewick, Wash., assignor to the United States of America as represented by the United States Atomic Energy Commission
No Drawing. Filed Mar. 21, 1961, Ser. No. 97,392
14 Claims. (Cl. 75—84.1)

This invention deals with the preparation of actinide-metal-containing aluminum alloys from actinide chlorides or chlorinatable actinide material.

Aluminum alloys of the kind described are used as fuel of neutronic reactors. For instance, aluminum-plutonium alloys are used in the plutonium recycle testing reactor and uranium-aluminum or uranium-plutonium-aluminum alloys for the materials testing reactor.

Usually commercially available relatively raw actinide oxides are used for the preparation of aluminum fuel alloys. When these oxides are dissolved in alkali metal chloride and chlorinated in the presence of aluminum, actinide chloride is formed; the chloride, however, reacts only to a very minor degree with the aluminum metal so that an insufficient amount of actinide metal is alloyed with the aluminum.

A process has been developed in which the fuel material is dissolved in an equimolar mixture of alkali metal chloride and aluminum chloride and the uranium chloride formed is then reduced with aluminum. This process is the subject matter of U.S. Patent No. 2,948,568 granted to this inventor on August 9, 1960. That process is dependent on the presence of the equimolar alkali metal chloride-aluminum chloride double salt.

It is an object of this invention to prepare an actinide-metal-aluminum alloy from or via the actinide chloride by which the actinide chloride is reduced almost quantitatively in the absence of aluminum chloride and wherein the actinide metal is alloyed directly with aluminum.

Contrary to all reasoning, it was found that an actinide chloride dissolved in alkali metal chloride only can be reduced to the metal to a very high degree if oxygen or an oxygen-containing gas is passed through the melted mass during reaction. An explanation for this unexpected phenomenon cannot be given.

The process of this invention comprises dissolving actinide oxide or other chlorinatable actinide substance in molten alkali metal chloride, introducing a chlorinating agent into the molten mass, adding aluminum to the mass, thoroughly contacting the reaction mass with an oxygen-containing gas whereby actinide metal is formed and alloyed with aluminum metal. Of course, the reaction of actinide chloride when dissolved in molten alkali metal chloride with aluminum while oxygen is passed through the mass is also considered invention.

In carrying out the process of this invention, the actinide material is first dissolved in alkali metal chloride. As the actinide material for chlorination, the oxide is best suitable. Of course, if actinide chloride is available as the starting material, no chlorination step is necessary. Any alkali metal chloride is suitable as solvent for the actinide chloride; however, because of its comparatively low melting point (about 658° C.) the potassium chloride-sodium chloride eutectic, which is the equimolar composition, is preferred. The salt is preferably brought to a temperature of from 650 to 700° C. prior to the introduction of the actinide material. After the actinide substance has dissolved, the salt solution is heated to between 730 and 770° C.

In the case of an actinide substance other than the chloride, chlorination is first carried out by introducing anhydrous hydrogen chloride, chlorine and/or phosgene into the molten mass; chlorine is the preferred chlorinating agent. One hour is usually sufficient for quantitative reaction.

Thereafter aluminum metal is added to the molten salt; an excess of aluminum over the amount stoichiometrically required for the reduction of the actinide halide is introduced, because the excess is necessary for the alloy formation. Apart from this, the quantity of aluminum is dependent on the composition desired of the alloy. The reduction, too, is carried out at a temperature of between 730 and 770° C. When the aluminum has melted, an oxygen-containing gas is introduced through the melted mass. Air, preferably moist air, or water vapor are suitable for this purpose. After approximately 30 minutes the reaction is completed. The reaction mass is then allowed to settle and to solidify; an aluminum-actinide metal alloy separates thereby from the salt. The two phases can be separated by mechanical means, or else the salt can be dissolved in an aqueous medium.

In the following, an example is given to illustrate the production of a plutonium-aluminum alloy.

Example

To 13.1 grams of an equimolar sodium chloride-potassium chloride mixture 0.1275 g. of crude plutonium dioxide were added. The mixture was heated to 750° C., and anhydrous hydrogen chloride was introduced for about 60 minutes at this temperature; a blue solution of plutonium trichloride was obtained. Thereafter 7.4576 grams of aluminum metal of 99.99% purity were added; after the aluminum had melted, the solution was sparged briskly with air for 35 minutes while the temperature of 750° C. was maintained. The reaction mass was then allowed to solidify, and both the salt and the metal phase were analyzed.

The alloy was found to contain 94.3% by weight of the plutonium originally present and the salt 2.85% thereof. There also was an insoluble residue of unreacted plutonium oxide which was found to contain the remaining 2.85% of plutonium. Such a residue can be recycled, so that there actually would be very little loss of plutonium.

Similarly satisfactory results were obtained with the process as applied to the production of uranium-aluminum and thorium-aluminum alloys.

It will be understood that this invention is not to be limited to the details given herein but that it may be modified within the scope of the appended claims.

What is claimed is:

1. A process of preparing aluminum-actinide metal alloys selected from the group consisting of uranium, plutonium, thorium and mixtures thereof, comprising dissolving actinide oxide in molten alkali metal chloride, introducing a chlorinating agent selected from the group consisting of hydrochloric acid, chlorine gas, phosgene and mixtures thereof into the molten mass whereby actinide chloride is formed, adding aluminum metal to the mass, passing an oxygen-containing gas selected from the group consisting of air, water vapor and mixtures thereof through the mass whereby actinide metal is formed and alloyed with aluminum, allowing the mass to cool and solidify whereby an aluminum-actinide alloy phase and a salt phase are obtained, and separating said two phases.

2. The process of claim 1 wherein the alkali metal chloride is a mixture of sodium chloride and potassium chloride.

3. The process of claim 2 wherein the sodium-potassium chloride is an equimolar mixture.

4. The process of claim 1 wherein the actinide oxide is plutonium dioxide.

5. The process of claim 1 wherein the actinide oxide is uranium oxide.

6. The process of claim 1 wherein the actinide oxide is thorium oxide.

7. The process of claim 1 wherein dissolution of the actinide oxide is carried out at a temperature of between 650 and 700° C.

8. The process of claim 1 wherein the temperature of the mass is held at between 730 and 770° C.

9. The process of claim 8 wherein the chlorinating agent is chlorine gas.

10. The process of claim 1 wherein the oxygen-containing gas is air.

11. The process of claim 10 wherein the air is moist air.

12. The process of claim 1 wherein the oxygen-containing gas is water vapor.

13. A process of preparing aluminum-actinide metal alloys selected from the group consisting of uranium, plutonium, thorium and mixtures thereof, comprising dissolving actinide oxide in a molten equimolar mixture of sodium chloride and potassium chloride at a temperature of about 650° C., introducing chlorine gas into the molten mass at a temperature of about 750° C. whereby actinide chloride is formed, adding aluminum metal to the mass, passing air through the mass while the temperature of 750° C. is maintained whereby actinide metal is formed and alloyed with aluminum, allowing the mass to cool and solidify whereby an aluminum-actinide alloy phase and a salt phase are obtained, and separating said two phases.

14. A process of preparing aluminum-actinide metal alloys, said actinide metal being selected from the group consisting of uranium, plutonium, thorium and mixtures thereof, comprising dissolving actinide chloride in a molten mixture of potassium chloride and sodium chloride, adding aluminum metal to the mass, passing air through the mass whereby actinide metal is formed and alloyed with aluminum, allowing the mass to cool and solidify whereby an aluminum-actinide alloy phase and a salt phase are obtained, and separating said two phases.

References Cited in the file of this patent

FOREIGN PATENTS

| | | |
|---|---|---|
| 798,687 | Great Britain | July 23, 1958 |
| 799,662 | Great Britain | Aug. 13, 1958 |